INVENTOR.
MILES DAVIS

BY

ATTORNEYS

INVENTOR
MILES DAVIS
BY [signature]
ATTORNEYS

WEB CUTTER CONTROL DEVICE FOR XEROGRAPHIC REPRODUCING APPARATUS

Filed Oct. 30, 1964 3 Sheets-Sheet 3

INVENTOR.
MILES DAVIS
BY [signature]
ATTORNEYS

United States Patent Office 3,401,613
Patented Sept. 17, 1968

3,401,613

WEB CUTTER CONTROL DEVICE FOR XEROGRAPHIC REPRODUCING APPARATUS

Miles Davis, Rochester, N.Y., assignor to Xerox Corporation, Rochester, N.Y., a corporation of New York Filed Oct. 30, 1964, Ser. No. 407,696
3 Claims. (Cl. 95—1.7)

ABSTRACT OF THE DISCLOSURE

A web cutter control device for electrostatic reproduction apparatus employing a scanning device which registers the passage of the leading and/or trailing edge of the documents being copied, a magnetic tape recorder which stores the information generated by the scanning device, and a read head, write head and erase head which control and sense the information existing on the tape.

This invention relates to improvements in xerographic reproduction apparatus and, particularly, to an improved device for controlling the cutting of a web type of surface on which xerographic reproductions are formed. More specifically, this invention relates to improvements in xerographic reproduction apparatus by which a programming system is established for cutting a support surface web, on which xerographic reproductions are to appear, which may be marked for cutting in spaced relation to the leading and trailing edges of the reproduction corresponding to the leading and trailing edges of the original documents being reproduced.

It is the practice on automatic xerographic printers, such as the type disclosed in Patent No. 3,049,968, entitled, "Xerographic Reproducing Apparatus," to operate a continuously moving paper web support surface from a supply roll to a takeup roll in between which xerographic reproductions are printed thereon. Since the original document, from which the reproduction is formed, may vary in dimension and can be reproduced by the xerographic apparatus in magnified relation, a wide variance of spacing between successive prints may be required. In addition, it is the usual practice to move the paper web at a constant rate of speed, say, for example, approximately 20 feet per minute (4 inches per second), and, in so doing, a continued absence of reproduction causes a sizable accumulation of scrap paper on the takeup roll. For example, one minute's hesitation on the part of a human operator between feeding successive originals to the apparatus effects approximately 20 feet of scrap paper. On the other hand, accurately timed successive feeding of originals for eleven and one-half inch reproductions results in approximately twenty xerographically printed reproductions in the same web length.

Heretofore, the usual practice has been to periodically remove the takeup roll with the paper web wound thereon to another location whereat the paper was unwound and, with a manually operative cutter, cut the web so as to effect an approximate border on the leading and trailing edge of each xerographic print. By these former cutting means, considerable delay was incurred in effecting availability of the xerographic reproduction and, furthermore, required the services of additional personnel employed for this specific function.

Because of the variable occurrence of the cut on the moving web, it is preferable that a cutter mechanism be responsive to a reference means that is established for the particular presentation or arrangement of original documents introduced to the xerographic apparatus. In order for the cutter to respond in spaced relation to the reproduction, the reference means should emanate from relation of the origonal document to be reproduced whereby this relation is carried forth to the arrangement of reproductions on the support surface. When, as here, it is intended to cut the web in relation to both the leading and trailing edges of a reproduction, the reference means should be associated with its respective edges in order that the cutter be made to respond accordingly; that is, to cut the web in advance of a leading edge and after a trailing edge.

The principal object of this invention is to improve xerographic reproduction apparatus for controlling the cutting of a web type of surface on which xerographic reproductions are formed. It is a further object of the invention to form reference means on a recording medium in accordance with the leading and trailing edges of original documents in relation to electrostatic latent images corresponding to the positioning of original documents to be reproduced. These and other objects of the invention are attained by the apparatus herein disclosed, and will be apparent from the following description.

A preferred form of the invention is shown in the appended drawings in which.

Figure 1:
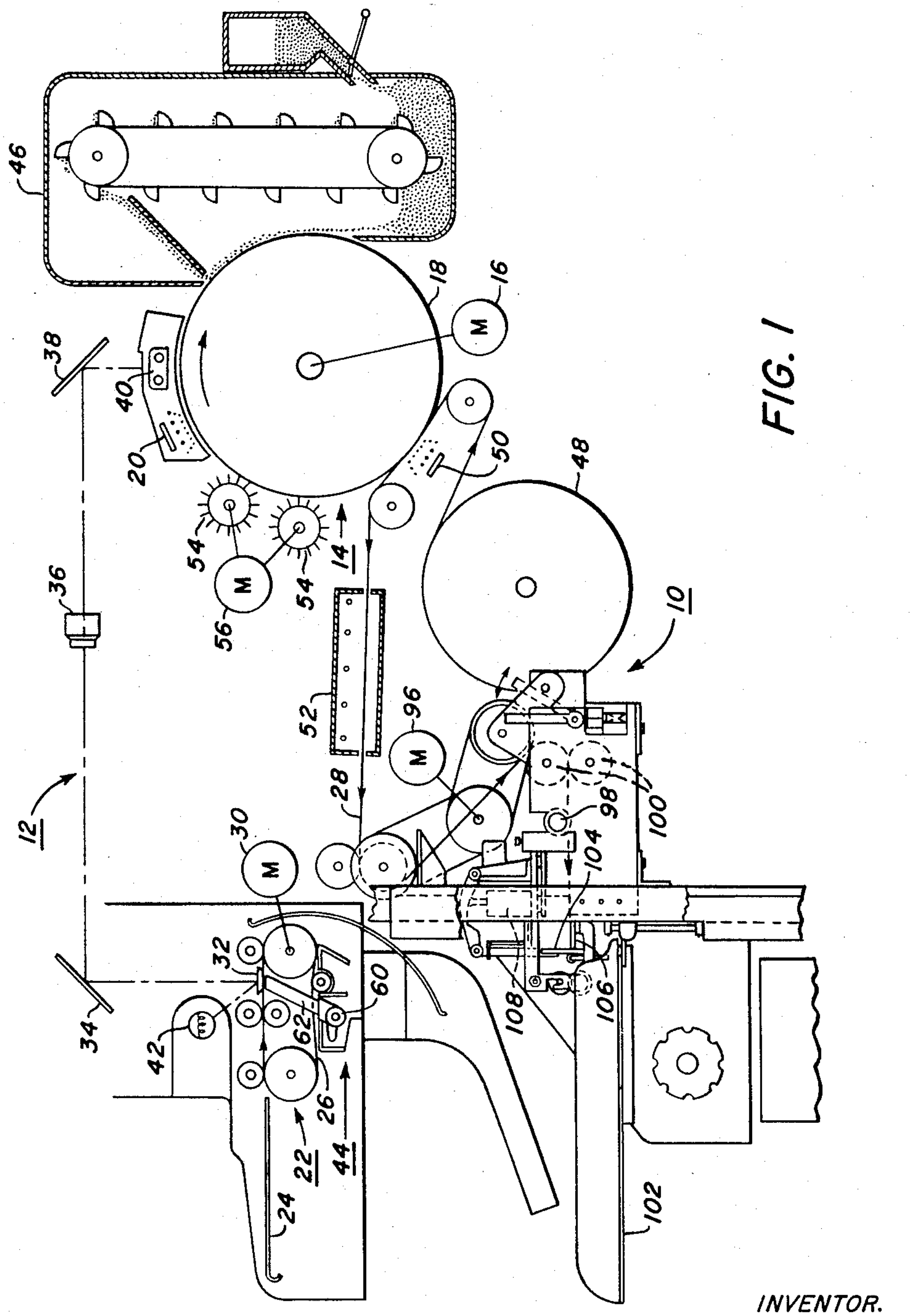
FIG. 1 is a schematic side elevation of an automatic xerographic printer employing the apparatus of the invention.

Referring to FIG. 1, the paper web cutter assembly of the invention, generally designated as 10, is shown in operative relation to a xerographic unit, generally designated as 12, which includes a xerographic plate in the form of drum 14 mounted in suitable bearings in the frame of the machine and is rotated at constant rate by motor 16. The drum comprises a photoconductive surface 18 on a conductive backing that is sensitized prior to exposure by means of a screened corona charging device 20, which may be of the type disclosed in Walkup Patent 2,777,957, that is energized from a suitable high potential source.

Exposure of the drum to the light image emanating from an original document discharges the photoconductive layer in the areas struck by light, whereby there remains on the drum an electrostatic latent image corresponding to the light image projected. To project an opaque original onto surface 18, a scanning apparatus 22 is employed, which may be of a type disclosed in Patent No. 3,105,425, granted to Cerasani et al. An original to be reproduced is manually fed from a support tray 24 onto endless belts 26 which are continually moved at constant rate propotrional to the rate of movement of the paper web 28 by a drive motor 30.

As an original document moves on the belts, it passes under a sight glass 32 whereat an optical path is established from which the image on the document is reflected from mirror 34, thence through an objective lens 36 to a mirror 38 through a variable width exposure slit 40 so as to be exposed normal to xerographic surface 18. A lamp 42 serves to illuminate the original document under the glass 32 and also serves to emit light to a copy detection device 44 when there is a spacing between documents and in the absence of documents to be reproduced.

After exposure, the images of the documents are developed by developing apparatus 46, which may be of the type disclosed in the above referred to Patent No. 3,105,-425, in which a two-component developer material is cascaded over the drum surface 18.

The support surface in the form of the paper web 28 is obtained from a supply spool 48, is fed over suitable guide and tensioning rolls, and directed into surface contact with the drum in the immediate vicinity of corona generating transfer device 50. After transfer, the support surface is separated from the drum surface and guided through a suitable heat fuser 52, which may be of a type disclosed in Crumrine et al. Patent No. 2,852,651, whereby the powder image is permanently affixed to the support surface. Subsequent to the transfer of the image, any residual image on surface 18 is removed by brush cleaning with brushes 54 which are rotated by motor 56. The web 28 then proceeds through web cutter assembly 10, as described below.

In order to detect the reference leading and trailing edges of the original documents for effecting cutting of the paper 28 in accordance therewith, the detection device 44 has a photocell 60 which is adapted to receive light rays from the lamp 42 by reflection from an inclined mirror surface 62. Light thereby transmitted is received by the light-sensitive photocell 60 which is characterized by emitting an electrical signal on the realization of light wherein the magnitude of the signal varies in accordance with the intensity of illumination realized. In the preferred arrangement, the signal emitted decreases in order of magnitude when there is an obstruction in the illumination path, such as the presence of documents on the belts 26, and increases in order of magnitude when no obstruction exists. As an original document moves on belts 26, the leading edge thereof effects an obstruction of the illumination path causing cell 60 to emit a low level signal output and, when the document trailing edge moves out of the path, the signal produced by the photocell is of a higher level.

Figure 2:
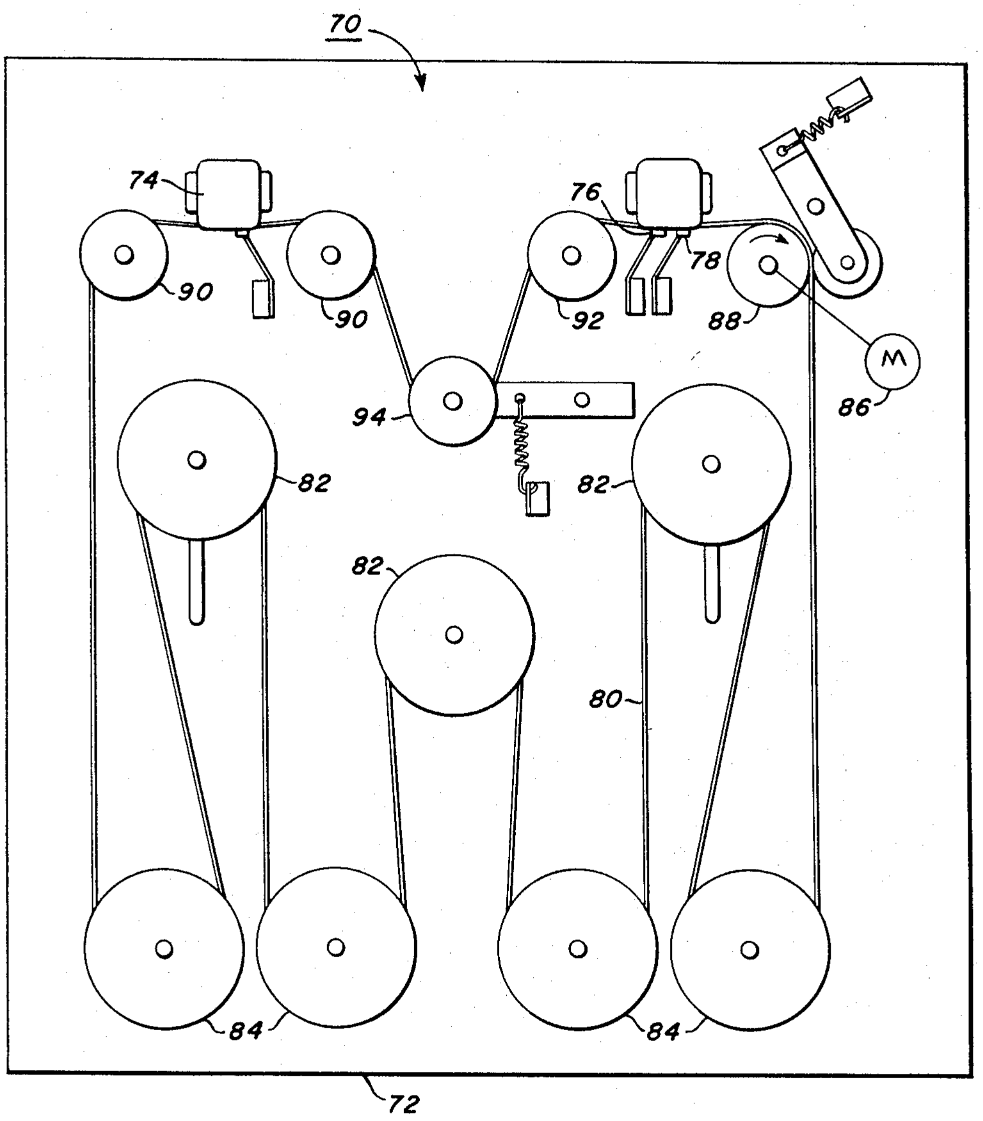
FIG. 2 is a view illustrating the cutter control apparatus of the invention in relation to the xerographic drum.

The signals produced by the photocell 60 are utilized, through a circuit to be described hereinafter, for controlling recording on a magnetic tape in accordance with the leading and trailing edges of successive documents being scanned. To this end, there is provided a magnetic recording device, shown in FIG. 2 and illustrated by the reference numeral 70. The recording device is mounted in a housing 72 and includes a read head 74, an erase head 76, and a write head 78, all of which are suitably mounted in the housing. An endless magnetic tape 80 is wound alternately around and between the pulleys of one set of pulleys 82 and the pulleys of a second set of pulleys 84 and is applied to and movable relative to the heads 74, 76 and 78.

The arrangement and spacing between the sets of pulleys 82 and 84 is such that a relatively long tape of predetermined length can be utilized and, in effect, serves as a storage device for the tape. Any other suitable storage device may be utilized, such as an open container, which will permit entry and withdrawal of the tape at equal rates. The tape 80 is driven through the heads 74, 76 and 78 and the pulleys in the sets 82, 84 by a synchronous motor 86 connected to a drive pulley 88 which rotates in the direction indicated by the arrow. Preferably, the motor 86 drives the pulley 88 at a rotational speed which will effect movement of the magnetic tape through the heads at a speed equal to the speed of the movement of the web 28. Other tape speeds may be used, however, for a purpose that will be described hereinafter. The chosen speed should be at some predetermined relationship with respct to the paper web speed during xerographic processing.

The magnetic tape recording apparatus 70 also includes a pair of pulleys 90 which maintain the tape, under light pressure, against the read head 75 and a second pair of pulleys 92 which maintain the tape against the erase and write heads 76, 78, respectively. Between the pairs of pulleys 90, 92, the tape is wound around a pulley 94 which may be suitably biased by springs in order to maintain a slight tension in the tape throughout its entire length. The circuit for the recording apparatus 70 is not shown since this may be of the conventional type, which, when turned on, permits recording on the tape 80 by the write head 78, pickup of a recorded magnetic mark by the read head 74, and erase of this mark by the erase head 76. The cooperation of the apparatus 70 with the web cutting control circuit of FIG. 3 will be described during the operational description hereinafter.

By the recording apparatus thus described, control recording marks are formed on a magnetic tape to be translated therefrom for producing control signals to effect subsequent web cutting operation. Whereas the signals produced are described herein with particular reference to effect operation of a cutter apparatus, it is apparent that the recording apparatus could be employed to effect signals for other purposes, as, for example, to fold, puch, or other related operations in ference to a point on the web, or xerographic reproduction. Furthermore, although particular emphasis is placed on effecting control signals in a particular relationship with the leading and trailing edges of xerographic reproductions, variations in apparatus arrangement would permit effecting control signals in any relation thereto.

As shown in FIG. 1, the web 28 is continuously drawn from the supply roll 48 and advanced through the paper cutter assembly 10 by the motive force furnished from a motor 96. The force therefrom is transmitted through a suitable speed reducer and drive system, not shown, to drive a platen roller 98 under which the web 28 is in contact. The web passes between two rollers 100 as it is driven by the roller 98 and is conveyed toward a copy bin 102. Further description of the web drive mechanism, which is described in detail in Patent No. 3,105,425, is not necessary for understanding of the present invention. The web 28, in moving above the bin 102, moves between a knife member 104, normally in an ineffective position, and a bed plate 106 for the cutter assembly 10. A pair of solenoids 108, mounted on the assembly 10, having their plungers connected to the knife member 104 for actuating the same when energized for cutting the web 28. After cutting, when the solenoids are de-energized, the knife member is raised out of operative condition by a suitable spring, not shown.

In operation, all the components of the xerographic unit 12 are in their operating condition. The corona generating device 20 is continually applying a uniform electrostatic charge on the surface 18 and, in the absence of an orginalf document, the charge on the surface 18 is substantially dissipated by the exposure of continuous light from the lamp 42 being reflected from the mirror 34 to lens 36, mirror 38, and through aperture 40. The developing apparatus 46 is continually cascading developing powder over the surface 18 and the web 28 is continuously moved between the corona generating device 50 and the surface 18, through the fuser 52 and through cutter assembly 10, as aferesaid. For purposes of the present description, it is assummed that the recording apparatus 70 is turned on and the magnetic tape 80 is being driven at a speed equal to the speed of the web movement.

Figure 3:
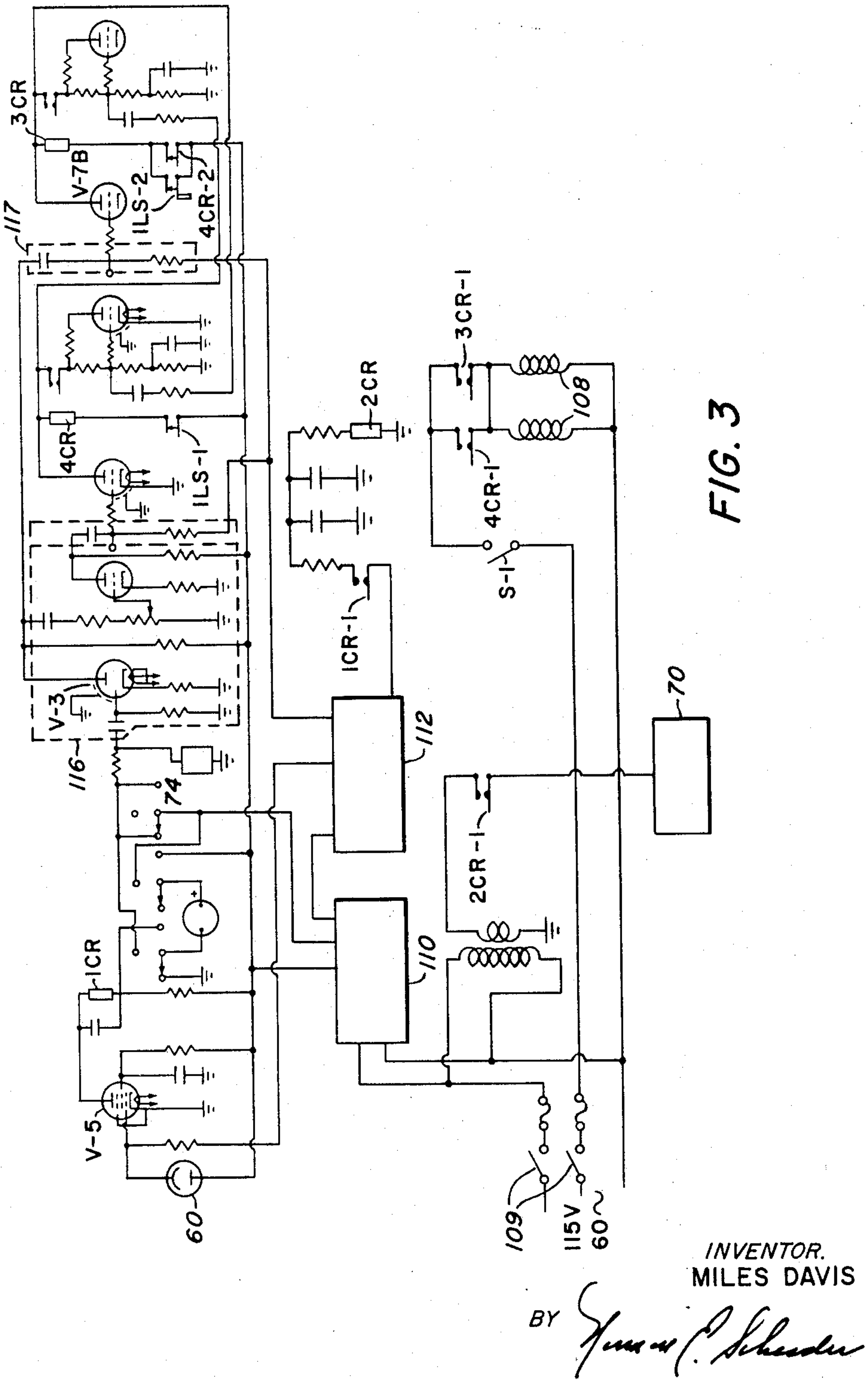
FIG. 3 is a schematic diagram of the control circuit for the present invention.

Referring to FIG. 3, with the main switches 109 closed for inducing electric current to the circuit, positive rectified direct current is obtained from the part of the circuit designated as 110, and negative rectified direct current is obtained from the part of the circuit designated as 112. For discussion purposes, it is assumed that switch S–1 has been set to effect cutting of the web 28 on the leading and trailing edges of a xerographic reproduction. With the main switches 109 closed, the pentode V–5 will conduct to energize a relay 1CR in the plate circuit thereof, and a relay 2CR will be energized by current furnished from the circuit 112.

Referring to FIGS. 1 and 3, documents to be reproduced are first fed from support tray 24 onto moving belts 26. As a document is moved thereon, the leading edge of the document traverses the light rays from the lamp 42 and, in effect, obstructs the illumination path between the lamp and the photocell 60. This decrease in illumination, in effect, decreases the electrical signal reaching the pentode V–5 and activates this tube to a bias below cut-off so as to de-energize the relay 1CR. This has the effect of permitting opening of the switch 1CR–1 to thereby de-energize the relay 2CR and permit its normally closed switch 2CR–1 to close. This closing turns on the recording apparatus 70 to cause the energization of the write head 78 which, in turn, will produce magnetically a control mark or pattern on the tape 80 corresponding to the leading edge of the document just scanned.

After scanning of the document by means of the lens system 34, 36, 38, at the instant the trailing edge of the document has passed over the glass plate 32 so as to readmit light from the lamp 42 to cell 60, there is an increase in the signal emitted by photocell 60 which activates the grid of pentode V–5 above cut-off, thereby energizing relay 1CR and consequently the relay 2CR so as to effect opening of normally closed switch 2CR–1. Opening of the switch 2CR–1 causes turning off of the recording apparatus 70 and the de-energization of the write head 78.

While the recording apparatus 70 is in operation, the write head will produce a magnetic control mark or pattern on the tape 80 for the full length of the document being scanned for xerographic processing. As succeeding documents are fed onto the belts 26, each leading edge obstructs the illumination path from lamp 42 to photocell 60 and again effects the operation of the recording apparatus 70 to produce a magnetic control pattern for each of the documents. The alternating energization of the write head 78 effects successive magnetic control patterns commencing and terminating in spaced relation on the tape 80 corresponding in length between the trailing and leading edges, respectively, of successive original documents.

The length of the magnetic tape 80, between the write head 78 and the read head 74 and which is wound between the sets of pulleys 82, 84 is approximately equal to the length of paper web extending between a point thereon which receives the leading edge of the powdered image of the developed xerographic image of a document and the cutter knife 104 plus the distance between the slit 40 and the transfer device 50 measured along the surface 18. These distances and lengths will insure that the leading end of the control pattern produced by write head 78 on the tape 80, which end corresponds to the leading edge of a document being imaged by the slit 40 upon the drum surface 80, will reach the read head 74 at exactly the same time that the xerographically reproduced leading edge on the web 28 will reach the cutter knife 104.

On detection of the leading end of the magnetic control pattern on the tape 80 by the read head 74 and for the full length of the pattern, the signal produced by the head 74 is transmitted through the amplifier circuit 116 and differentiating circuit 117 and through a triode V–7B to energize a relay 3CR through normally closed switches 1LS–2. Energization of the relay 3CR closes the switch 3CR–1 causing energization of both solenoids 108. Energization of the solenoids 108 actuates the cutter knife 104 downwardly to cut the web 28 approximately along the leading edge of a xerographic reproduction. As the cutter completes its downward stroke, some part thereof momentarily engages microswitches 1LS–1 and 1LS–2 thereby opening their normally closed contacts and, consequently, the circuits to the relay 3CR. With the relay 3CR de-energized, the switch 3CR–1 is once again opened to cause de-energization of the solenoids 108. As the solenoids 108 are de-energized, suitable springs (not shown) actuate the knife 104 to its upper ineffective position.

Upon termination of the magnetic control pattern on the tape 80 which corresponds to the trailing edge of a document previously scanned, the read head 74 no longer produces a control signal for the tube V–7B and this change will effect the signal reaching the triode V–3 in the amplifier circuit 116. The change in the signal to the circuit 116, which in this case is a change in polarity of the biasing voltage at the grid of the triode V–3, will momentarily cause conduction of the triode V–4 for energizing a relay 4CR. This energization of relay 4CR will close the switch 4CR–1 for energizing both solenoids 108, thereby actuating the knife 104 downwardly to cut web 28 approximately along the trailing edge of a xerographic reproduction.

As the cutter completes its downward stroke, a portion thereof actuates microswitches 1LS–1 and 1LS–2 to open their normally closed contacts and, consequently, the circuit to the relay 4CR de-energized, the switch 4CR–1 is once again opened to cause de-energization of the solenoids 108. As solenoids 108 are de-energized, the knife is restored to its upper ineffective position as before. As the magnetic control pattern on the tape traverses the erase head 76, the pattern is erased and successive portions of the tape become deposed for magnetic recording by the write head 78.

By the apparatus thus described there is disclosed apparatus for forming magnetic control patterns on a magnetic tape and apparatus to cut a continuous web in spaced relation to the leading and trailing edges of a xerographic reproduction printed thereon in response to the leading and trailing ends of the patterns.

Since many changes could be made in the above construction and many apparently widely different embodiments of this invention could be made without departing from the scope thereof, it is intended that all matter contained in the drawings shall be interpreted as illustrative and not in a limiting sense. For instance, in the above description, the resultant control pattern is described as a continuous line having a length approximately equal to the length of the document being reproduced. The circuit of FIG. 3 may be arranged to effect actuation of switches for a fraction of a second upon energization of the various relays in the circuit. This will produce a single magnetic pattern mark for each of the leading and trailing edges of the documents being scanned.

What is claimed is:

1. A control device for use with a web cutting apparatus of an automatic electrostatic printer having a photoconductive plate movable through a series of processing steps wherein the cutting apparatus is adapted to cut a moving web support surface in accordance with the leading and trailing edges of successive documents being reproduced by the printer, said control device including:

a control circuit having a scanning means for detecting the leading edge of successive documents when the same are respectively imaged upon the plate;

said circuit including means for producing electrical signals responsive to the leading edges detected by said scanning means;

a magnetic tape recorder coupled to said circuit and having a write head and a read head;

said write head having means for producing a magnetic pattern on a magnetic tape in response to said electrical signals whereby the patterns will be arranged on the tape in accordance with leading edge images of the documents on the web support surface;

means for cutting the support surface;

said read head having means for sensing the patterns arranged in scanning relation to the web on said tape for producing a signal in accordance therewith;

means for bringing the patterns and read head together to effect sensing of the patterns within a predetermined period of time after producing the patterns, the period of time being in accordance with the period of time the leading edge of successive documents is detected by the control circuit and reaches said means for cutting the web support surface; and an electric circuit connected to said cutting means and having means responsive to said signals produced by the read head for actuating said cutting element whereby the web support material is cut at a point adjacent the leading edge of the reproductions of the documents.

2. A control device for use with a web cutting apparatus of an automatic electrostatic printer having a photoconductive plate movable through a series of processing steps wherein the cutting apparatus is adapted to cut a moving web support surface in accordance with the leading and trailing edges of successive documents being reproduced by the printer, said control device including:

a control circuit having a scanning means for detecting the leading and trailing edges of successive documents when the same are respectively imaged upon the plate;

said circuit including means for producing electrical signals responsive to the leading and trailing edges detected by the scanning means;

a magnetic tape recorder coupled to said circuit and having a write head and a read head;

said write head having means for producing a magnetic pattern on a magnetic tape in response to said electrical signals whereby the patterns will be arranged on the tape in accordance with images of the leading and trailing edges of the documents on the web support surface;

means for cutting the support surface;

said read head having means for sensing the patterns arranged in scanning relation to the web on said tape for producing signals in accordance therewith;

means for bringing the read heat and each pattern together to effect sensing of the pattern within a predetermined period of time after producing the pattern, the period of time being in accordance with the period of time the respective edge is detected by the control circuit and reaches said means for cutting the web support surface; and an electric circuit connected to said cutting means and having means responsive to said signals produced by the read head for actuating said cutting element whereby the web support material is cut at points adjacent the leading and trailing edges of the reproductions of the documents.

3. A control device for use with a web cutting apparatus for an automatic electrostatic printer having a photoconductive plate movable through a series of processing steps wherein the cutting apparatus is adapted to cut a moving web support surface in accordance with the leading and trailing edges of successive documents being produced by the printer, said control device including:

a control circuit having a scanning means for detecting the leading and trailing edges of successive documents when the same are respectively imaged upon the plate;

said circuit including means for producing electrical signals responsive to the leading and trailing edges detected by said scanning means;

a magnetic tape recorder coupled to said circuit and having an endless magnetic tape cooperable with a write head and read head;

said write head having means for producing a magnetic pattern on the magnetic tape in response to said electrical signals whereby the patterns will be arranged on the tape in accordance with images of the leading and trailing edges of the documents on the web support surface;

means for cutting the support surface;

said recorder including means for moving the tape between said write head and said read head during a predetermined time period equal to the time period between imaging of the leading edge of a document on the plate and the time that the reproduction of the leading edge reaches said cutting means;

said read head having means for sensing the patterns arranged in scanning relation to the web on said tape for producing signals in accordance therewith; and an electrical circuit connected to said cutting means having means responsive to said signals produced by the read head for actuating said cutting element whereby the web support material is cut at points adjacent the leading and trailing edges of the reproductions of the documents.

References Cited

UNITED STATES PATENTS

| | | | |
|---|---|---|---|
| 2,521,623 | 9/1950 | Arndt | 179—100.2 |
| 2,804,499 | 8/1957 | Butts | 179—100.2 |
| 3,051,568 | 8/1962 | Kaprelian | 95—1.7 X |
| 3,105,425 | 10/1963 | Cerasani | 95—1.7 |
| 3,184,540 | 5/1965 | Murphy | 346—24 X |
| 3,263,884 | 8/1966 | Doerfling | 83—71 X |

BERNARD KONICK, *Primary Examiner.*

L. J. SCHROEDER, *Assistant Examiner.*